United States Patent Office 3,759,897
Patented Sept. 18, 1973

3,759,897
CERTAIN 1-OXAMOYL-1,4-BENZODIAZEPINES
Hisao Yamamoto, Nishinomiya, Shigeho Inaba, Takarazuka, Tadashi Okamoto and Toshiyuki Hirohashi, Ashiya, Kikuo Ishizumi, Minoo, Michihiro Yamamoto, Toyonaka, Isamu Maruyama, Minoo, Kazuo Mori, Kobe, and Tsuyoshi Kobayashi, Minoo, Japan, assignors to Sumitomo Chemical Company, Ltd., Osaka, Japan
No Drawing. Original application Jan. 19, 1970, Ser. No. 4,040, now Patent No. 3,663,534. Divided and this application Feb. 25, 1972, Ser. No. 229,598
Claims priority, application Japan, Jan. 25, 1969, 44/5,573, 44/5,574, 44/5,575; Apr. 18, 1969, 44/30,604; May 13, 1969, 44/37,159; June 9, 1969, 44/45,690
Int. Cl. C07d 53/06
U.S. Cl. 260—239 BD
2 Claims

ABSTRACT OF THE DISCLOSURE

A novel process for preparing benzodiazepine derivatives and salts thereof, which are useful as tranquilizers, muscle-relaxants, antispasmodics and hypnotics. This process is shown by reaction schema as follows:

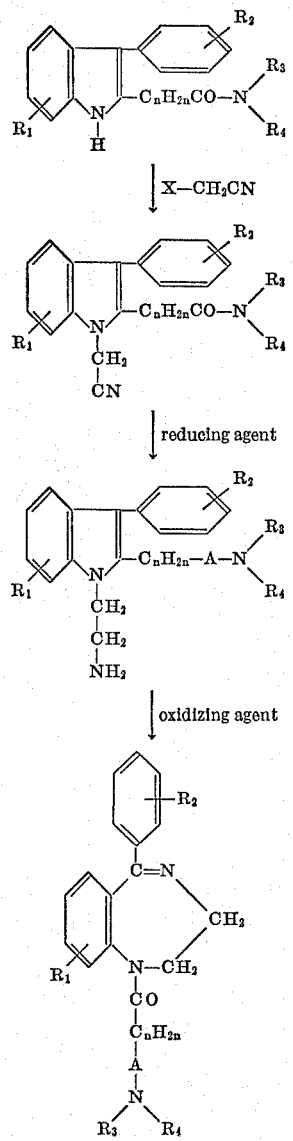

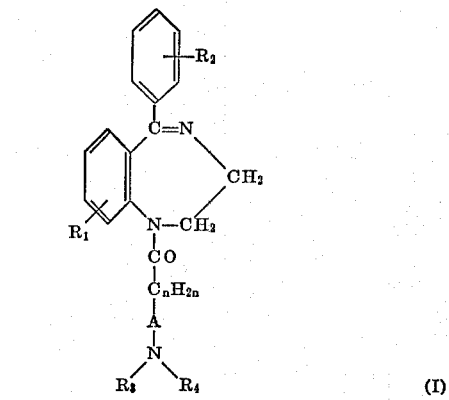

wherein $R_1$ and $R_2$ signify individually hydrogen atom, halogen atom, lower alkyl group having up to 4 carbon atoms, lower alkoxy group having up to 4 carbon atoms, trihalomethyl group, nitro group or amino group; $R_3$ and $R_4$ signify individually hydrogen atom or lower alkyl group having up to 4 carbon atoms; and A signifies a carbonyl group or a methylene group, $n$ signifies 0, 1 or 2, and X signifies a halogen atom. Among these compounds, benzodiazepine derivatives wherein $n$ is 0 and A is carbonyl group are novel compounds.

This is a division of application Ser. No. 4,040 filed Jan. 19, 1970, now U.S. Patent 3,663,534.

This invention relates to a novel process for preparing benzodiazepine derivatives and salts thereof which are of great importance as medicines. More particularly, this invention pertains to a novel process for preparing benzodiazepine derivatives of the Formula I:

wherein $R_1$ and $R_2$ signify individually hydrogen atom, halogen atom lower alkyl group having up to 4 carbon atoms, lower alkoxy group having up to 4 carbon atoms, trihalomethyl group, nitro group or amino group; $R_3$ and $R_4$ signify individually hydrogen atom or lower alkyl group having up to 4 carbon atoms; and A signifies a carbonyl group or a methylene group and $n$ signifies 0, 1 or 2, and salts thereof.

The invention also relates to intermediates useful in the preparation of the above compounds.

This invention also relates to novel benzodiazepine derivatives which are useful as medicines.

In the compound represented by the aforesaid Formula I, examples of the halogen atom include chlorine, bromine, iodine and fluorine atoms; examples of the lower alkyl group include methyl, ethyl, n-propyl, isopropyl, n-butyl, isobutyl, tertiary butyl groups; examples of the lower alkoxy group include methoxy, ethoxy, n-propoxy, isopropoxy, n-butoxy, isobutoxy and tertiary butoxy groups; and a preferable example of the trihalomethyl group is a trifluoromethyl group. The —$C_nH_{2n}$— represents a straight- or branched-chain alkylene group, including, for example, methylene, ethylene, 1-methylethylene, 2-methylethylene, trimethylene, 1-methyltrimethylene and 2-methyltrimethylene groups.

Hitherto it has been known that various types of benzodiazepine derivatives are useful as medicines, especially as tranquilizers, muscle-relaxants, antispasmodics and hypnotics and many methods for production of these medicines have been proposed.

The present inventors studied to develop novel process for production of such useful benzodiazepine derivatives and have been successful in finding a quite novel and characteristic process. That is, we have found a process for preparation of benzodiazepine derivatives, in which a 1-aminoethylindole derivative of the Formula II:

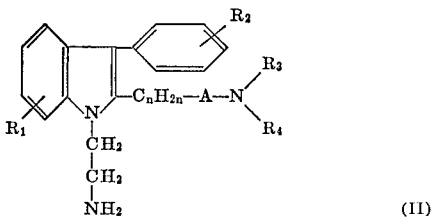

wherein $R_1$, $R_2$, $R_3$, $R_4$, A and $n$ are as defined above, or its salt with an axidizing agent to yield the objective benzodiazepine derivative of the Formula I. This process is due to ring expansion reaction from 5-membered indole ring to a 7-membered benzodiazepine ring and quite novel and characteristic.

The 1-aminoethylindole derivatives of the Formula II which are employed in this process are novel compounds and can easily be prepared by reducing 1-cyanomethylindole derivative of the Formula III:

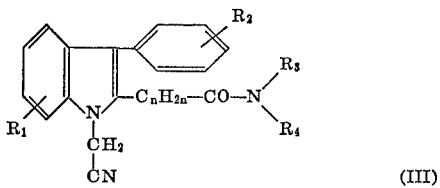

wherein $R_1$, $R_2$, $R_3$, $R_4$ and $n$ are as defined above. The compounds of the Formula III are also novel and can be obtained by treating indole derivatives of the Formula IV:

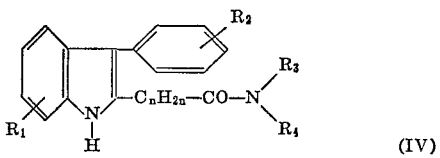

wherein $R_1$, $R_2$, $R_3$, $R_4$ and $n$ are as defined above, with a haloacetonitrile. The process of the present invention may be illustrated as follows:

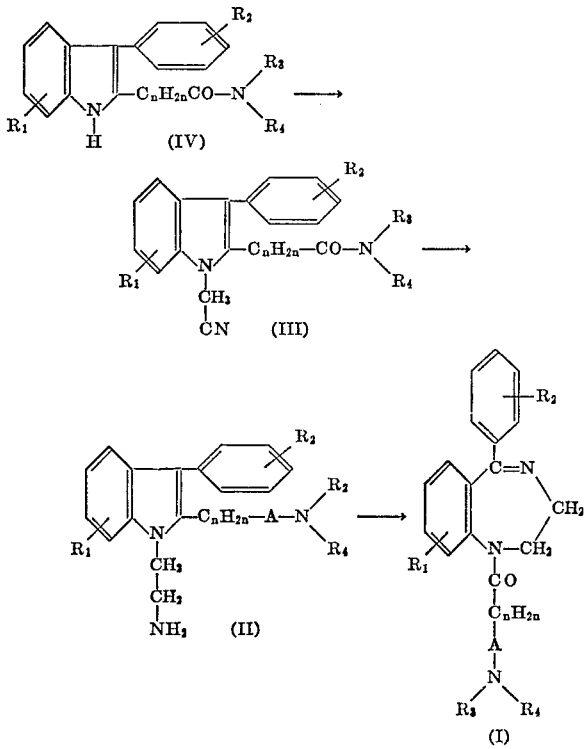

wherein $R_1$, $R_2$, $R_3$, $R_4$, A and $n$ are as defined above.

All of these processes proceed smoothly and give the objective products in high yields, and therefore these procedures are quite advantageous in practice.

The benzodiazepine derivative thus obtained have prominent effects as tranquilizers, muscle-relaxants, anti-spasmodics and hypnotics and, on the other hand, are useful as intermediates for other benzodiazepine derivatives. Among the benzodiazepine derivatives obtained by this process, there are some novel compounds.

An object of this invention is to provide a novel process for preparing benzodiazepine derivatives of the Formula I and salts thereof.

Another object is to provide novel 1-oxamoylbenzodiazepine derivatives having prominent effects as tranquilizers, muscle-relaxants, anti-spasmodics and hypnotics.

A further object is to provide novel indole derivatives and a process for preparing the same.

Other objects of the invention will become apparent from the description that follows.

The indole derivatives of the Formula IV used as starting materials in this invention may be prepared by amidation of the corresponding indole-2-aliphatic acid derivative which is described in our German Patent application No. P 18 14 332.3 which was laid open for public inspection on Oct. 16, 1969.

In the process of this invention, the indole derivatives of the Formula IV are treated with haloacetonitrile of the Formula V:

$$X-CH_2-CN \qquad (V)$$

wherein X signifies a halogen atom, to yield 1-cyanomethylindole derivative of the Formula III. The haloacetonitrile derivative is used in at least stoichiometric amount. The reaction may be carried out by treating an indole derivative of the Formula IV with a haloacetonitrile of the Formula V in the presence of an alkaline agent or after the metal salt has been formed with the alkaline reagent. Examples of the alkaline agents include, for instance, alkali metal hydrides, alkaline earth metal hydrides, alkali metal hydroxides, alkaline earth metal hydroxides, alkali metal amides, alkaline earth metal amides, alkali metal alkoxides, alkaline earth metal alkoxides alkyl alkali metals, aryl alkali metals, organic amines such as triethylamine, dimethylaniline and pyridine and the like. It is preferable to use, as an alkaline reagent, sodium hydrides, lithium hydrides, sodium amides, potassium amides, lithium amides, butyl lithium, phenyl sodium, phenyl lithium and the like. The reactions are carried out usually in a solvent. Suitable solvents are benzene, toluene, xylene, dimethylformamide, dioxane, tetrahydrofuran or the like. This reaction may be generally effected at a temperature within the range from 0° to 150° C. However, higher or lower temperature is sometimes found more satisfactory.

According to the above process, the following 1-cyanomethylindole derivatives, for example, may be obtained:

1-cyanomethyl-2-(N,N-dimethylcarbamoyl)-3-phenylindole,
1-cyanomethyl-2-(N,N-dimethylcarbamoyl)-3-phenyl-5-chloroindole,
1-cyanomethyl-2-(N,N-dimethylcarbamoyl)-3-phenyl-5-bromoindole,
1-cyanomethyl-2-(N,N-dimethylcarbamoyl)-3-phenyl-5-methoxyindole,
1-cyanomethyl-2-(N,N-dimethylcarbamoyl)-3-phenyl-5-nitroindole,
1-cyanomethyl-2-(N,N-dimethylcarbamoyl)-3-phenyl-5-trifluoromethylindole,
1-cyanomethyl-2-carbomayl-3-phenylindole,
1-cyanomethyl-2-carbamoyl-3-phenyl-5-chloroindole,
1-cyanomethyl-2-carbamoyl-3-phenyl-5-methoxyindole,
1-cyanomethyl-2-carbamoyl-3-phenyl-5-methylindole,
1-cyanomethyl-2-carbamoyl-3-phenyl-5-trifluoromethylindole,
1-cyanomethyl-2-carbamoyl-3-phenyl-5-nitroindole, 1-cyanomethyl-2-carbamoyl-3-(p-chlorophenyl)-
   5-chloroindole,
1-cyanomethyl-2-(N,N-diethylcarbamoyl)-
   3-phenylindole,
1-cyanomethyl-2-(N,N-diethylcarbamoyl)-
   3-phenyl-5-chloroindole,
1-cyanomethyl-2-(N,N-diethylcarbamoyl)-
   3-phenyl-5-trifluoromethylindole,
1-cyanomethyl-2-(N,N-diethylcarbamoyl)-
   3-phenyl-5-bromoindole,
1-cyanomethyl-2-(N,N-diethylcarbamoyl)-
   3-phenyl-5-nitroindole,
1-cyanomethyl-2-(N,N-diethylcarbamoyl)-
   3-(o-fluorophenyl)-5-nitroindole,
1-cyanomethyl-2-(N,N-diethylcarbamoyl)-
   3-(o-fluorophenyl)-5-chloroindole,
1-cyanomethyl-2-(N,N-diethylcarbamoyl)-
   3-(o-chlorophenyl)-5-chloroindole,
1-cyanomethyl-2-(N,N-diethylcarbamoyl)-
   3-(p-chlorophenyl)-5-chloroindole,
1-cyanomethyl-2-(N,N-diethylcarbamoyl)-
   3-(o-chlorophenyl)-5-chloroindole,
1-cyanomethyl-2-(N,N-diethylcarbamoyl)-
   3-(o-fluorophenyl)-5-chloroindole,
1-cyanomethyl-2-(N-methylcarbamoyl)-3-phenylindole,
1-cyanomethyl-2-(N-methylcarbamoyl)-
   3-phenyl-5-chloroindole,
1-cyanomethyl-2-(N-methylcarbamoyl)-
   3-phenyl-5-nitroindole,
1-cyanomethyl-2-(N-methylcarbamoyl)-
   3-phenyl-5-methoxyindole,
1-cyanomethyl-2-(N-ethylcarbamoyl)-
   3-phenyl-5-chloroindole,
1-cyanomethyl-2-(N-ethylcarbamoyl)-
   3-phenyl-5-nitroindole,
1-cyanomethyl-2-(N-methyl-N-ethylcarbamoyl)-
   3-phenylindole,
1-cyanomethyl-2-(N-methyl-N-ethylcarbamoyl)-3-
   phenyl-5-chloroindole,
1-cyanomethyl-2-(N,N-dipropylcarbamoyl)-3-phenyl-
   5-chloroindole,
1-cyanomethyl-2-(N,N-dimethylcarbamoylmethyl)-
   3-phenyl-5-chloroindole.
1-cyanomethyl-2-(N,N-dimethylcarbamoylmethyl)-3-
   phenylindole,
1-cyanomethyl-2-(N,N-diethylcarbamoylmethyl)-3-
   phenylindole,
1-cyanomethyl-2-(N,N-diethylcarbamoylmethyl)-3-
   phenyl-5-chloroindole,
1-cyanomethyl-2-(N,N-dimethylcarbamoylethyl)-3-
   phenyl-5-chloroindole.
1-cyanomethyl-2-(N,N-dimethylcarbamoylpropyl)-3-
   phenyl-5-chloroindole,
1-cyanomethyl-2-(N,N-dimethylcarbamoylmethyl)-3-
   phenyl-5-methoxyindole,
1-cyanomethyl-2-(N,N-di-n-butylcarbamoyl)-3-phenyl-
   indole, and
1-cyanomethyl-2-(N,N-dimethylcarbamoyl)-3-
   phenyl-5-n-butylindole.

The thus-obtained 1-cyanomethylindole derivative of the Formula III may be reduced to a corresponding 1-amino-ethylindole derivative of the Formula II on treatment with a reducing agent capable of at least converting the cyano group to the corresponding aminomethyl group. Examples of the reducing agents include hydrogen in the presence of a hydrogenation catalyst; alkali metals in alkanols such as sodium in ethanol or sodium in butanol; complex metal hydride, for example, lithium aluminum hydride or mixed hydride such as the mixture of lithium aluminium hydride and aluminum chloride, of sodium borohydride and aluminum chloride, of sodium borohydride and boron trifluoride or the like; and boron hydrides such as diborane. In the reduction of the process of this invention, a carbonyl group and/or a nitro group represented by the symbol $R_1$ or $R_2$, in the Formula III may be also reduced to a methylene group or an amino group respectively depending on the kind of the 1-cyanomethylindole derivative and the reducing agent employed. On the other hand it is possible to selectively reduce the 1-cyanomethylindole derivative by using a suitable reducing agent and controlling the reaction condition such as amount of the reducing agent, reaction temperature and the like.

When the reduction is carried out by catalytic hydrogenation, examples of suitable catalysts include palladium-, nickel-, cobalt- or platinum-system catalyst such as palladium carbon, Raney nickel, Raney cobalt, nickel boride or platinum oxide. The reaction is carried out in the presence of a solvent such as water, inert organic solvent such as methanol, ethanol, tetrahydrofuran, dioxane, ether, benzene, acetic acid or the like or solvent mixture thereof. The reaction is carried out at room temperature or an elevated temperature in an open vessel or in a vessel under pressure.

When the process is carried out by using lithium aluminium hydride or some mixed hydride such as a mixture of lithium aluminum hydride and aluminium chloride or the like, the 1-cyanomethylindole derivative of the Formula III may be reduced to the corresponding 1-aminoethylindole derivative of the Formula II wherein A is methylene group. The reaction is carried out in the presence of a solvent such as ether, tetrahydrofuran, dioxane or the like or a solvent mixture thereof. The reaction is generally effected at a temperature within the range from −50° C. in the boiling point of the solvent employed.

The 1-cyanomethylindole derivative of the Formula III wherein $R_1$ is a nitro group can be converted to the corresponding 1-aminoethylindole derivative of the Formula II wherein $R_1$ is a nitro group by using reducing agents capable of reducing selectively the cyano group to an aminomethyl group without effecting the nitro group. Suitable reducing agents are, for example, diborane, sodium borohydride in the presence of a metal hydride such as aluminium chloride, lithium bromide or cobalt chloride, or in the presence of boron trifluoride or the like, or sodium hydride in the presence of boron trifluoride. When diborane is used as a reducing agent, gaseous diborane may be introduced into the reaction mixture, or diborane may be generated in the reaction system. For example, the reduction is effected by using diborane generated from sodium borohydride and boron trifluoride or mercurous chloride in the reaction system. The reaction is preferably carried out in the presence of a solvent such as tetrahydrofuran, dioxane, ether, diglyme or the like or a solvent mixture thereof, at a room temperature, at a temperature below room temperature or at an elevated temperature.

It is also possible, if desired, to convert a nitro or amino group represented by the symbol $R_1$, $R_2$, $R_3$ or $R_4$ by diazotization and then halogenation of the amine compound after or without the above-mentioned reduction.

The 1-aminoethylindole derivatives of the Formula II are obtained in the free form or in the form of their salts. The acid-addition salts are obtained by treating free bases with inorganic or organic acids such as hydrogen chloride, hydrogen bromide, sulfuric acid, nitric acid, phosphoric acid, acetic acid, oxalic acid, succinic acid or citric acid.

According to the above processes, there are obtained, for example, the following 1-aminoethylindole derivatives.

1-aminoethyl-2-(N,N-dimethylaminomethyl)-3-
   phenylindole,
1-aminoethyl-2-aminomethyl-3-phenylindole,
1-aminoethyl-2-(N,N-dimethylaminomethyl)-3-phenyl-
   5-chloroindole,
1-aminoethyl-2-(N,N-dimethylaminomethyl)-3-phenyl-
   5-trifluoromethylindole, 1-aminoethyl-2-(N-ethylaminomethyl)-3-phenyl-5-chloroindole,
1-aminoethyl-2-(N,N-diethylaminomethyl)-3-phenylindole,
1-aminoethyl-2-(N,N-diethylaminomethyl)-3-(o-fluorophenyl)-5-chloroindole,
1-aminoethyl-2-(N,N-diethylaminomethyl)-3-phenyl-5-chloroindole,
1-aminoethyl-2-(N,N-dimethylaminoethyl)-3-phenyl-5-chloroindole,
1-aminoethyl-2-(N,N-dimethylaminoethyl)-3-phenylindole,
1-aminoethyl-2-(N,N-diethylaminoethyl)-3-phenylindole,
1-aminoethyl-2-(N,N-diethylaminoethyl)-3-phenyl 5-chloroindole,
1-aminoethyl-2-(N,N-dimethylaminopropyl)-3-phenyl-5-chloroindole,
1-aminoethyl-2-(N,N-dimethylaminobutyl)-3-phenyl-5-chloroindole,
1-aminoethyl-2-(N,N-dimethylaminoethyl)-3-phenyl-5-methoxyindole,
1-aminoethyl-2-(N,N-dimethylaminomethyl)-3-phenyl-5-methylindole,
1-aminoethyl-2-(N,N-dimethylaminomethyl)-3-(o-chlorophenyl)-5-chloroindole,
1-aminoethyl-2-carbamoyl-3-phenylindole,
1-aminoethyl-2-carbamoyl-3-phenyl-5-chloroindole,
1-aminoethyl-2-carbamoyl-3-phenyl-5-methoxyindole,
1-aminoethyl-2-carbamoyl-3-phenyl-5-methylindole,
1-aminoethyl-2-carbamoyl-3-phenyl-5-trifluoromethylindole,
1-aminoethyl-2-carbamoyl-3-phenyl-5-nitro indole,
1-aminoethyl-2-carbamoyl-3-(p-chlorophenyl)-5-chloroindole,
1-aminoethyl-2-(N-methylcarbamoyl)-3-phenylindole,
1-aminoethyl-2-(N-methylcarbamoyl)-3-phenyl-5-chloroindole,
1-aminoethyl-2-(N-methylcarbamoyl)-3-phenyl-5-nitroindole,
1-aminoethyl-2-(N-methylcarbamoyl)-3-phenyl-5-methoxyindole,
1-aminoethyl-2-(N-ethylcarbamoyl)-3-phenyl-5-chloroindole,
1-aminoethyl-2-(N-ethylcarbamoyl)-3-phenyl-5-nitroindole,
1-aminoethyl-2-(N,N-dimethylcarbamoyl)-3-phenylindole,
1-aminoethyl-2-(N,N-dimethylcarbamoyl)-3-phenyl-5-chloroindole,
1-aminoethyl-2-(N,N-dimethylcarbamoyl)-3-phenyl-5-methoxyindole,
1-aminoethyl-2-(N,N-dimethylcarbamoyl)-3-phenyl-5-nitroindole,
1-aminoethyl-2-(N,N-dimethylcarbamoyl)-3-(p-chlorophenyl)-5-chloroindole,
1-aminoethyl-2-(N,N-diethylcarbamoyl)-3-phenyl-5-chloroindole,
1-aminoethyl-2-(N,N-diethylcarbamoyl)-3-phenyl-5-trifluoromethylindole,
1-aminoethyl-2-(N,N-diethylcarbamoyl)-3-phenyl-5-bromoindole,
1-aminoethyl-2-(N,N-diethylcarbamoyl)-3-phenyl-5-nitroindole,
1-aminoethyl-2-(N,N-dimethylcarbamoyl)-3-(p-chlorophenyl)-5-nitroindole,
1-aminoethyl-2-(N,N-dimethylcarbamoyl)-3-(o-fluorophenyl)-5-nitroindole,
1-aminoethyl-2-(N-methyl-N-ethylcarbamoyl)-3-phenylindole,
1-aminoethyl-2-(N-methyl-N-ethylcarbamoyl)-3-phenyl-5-chloroindole,
1-aminoethyl-2-(N,N-dipropylcarbamoyl)-3-phenyl-5-chloroindole, and
1-aminoethyl-2-(N,N-dimethylcarbamoyl-3-phenyl-5-trifluoromethylindole.

In the final step of this valuable synthetic method, the 1-aminoethylindole derivative of the Formula II or salt thereof is converted to a benzodiazepine derivative of the Formula I on treatment with an appropriate oxidizing agent. Suitable oxidizing agents are, for example, ozone, hydrogen peroxide, peracids such as performic acid, peracetic acid or perbenzoic acid, chromic acid, potassium permanganate and the like. The preferred oxidizing agents are chromic acid and ozone. The oxidizing agent is used in the stoichiometric amount or more. The reaction is carried out in the presence of a solvent or solvents mixture. The choice of the solvent depends on the oxidizing agent employed, and is selected from the group consisting of water, inert organic solvent such as acetic acid, propionic acid, methanol, ethanol, chloroform, methylene chloride, benzene, toluene, dioxane, tetrahydrofuran, sulfuric acid and the like or solvents mixture. The reaction can be carried out at a temperature within the range from —50° C. to 200° C. In case the process is carried out by using chromic acid in acetic acid, the reaction is generally carried out at room temperature, at a temperature below room temperature or at an elevated temperature.

In case the process is carried out by using ozone, the reaction is carried out in a solvent such as acetic acid or formic acid, at room temperature or at a temperature below room temperature.

The desired benzodiazepine derivative may be separated from the reaction mixture by extraction, with or without prior nutralization, and by concentration to dryness. The product may be further purified, if desired, by recrystallization from a suitable solvent such as ethanol, isopropanol or the like.

The benzodiazepine derivative may be obtained in the form of acid-addition salt on treatment with an acid, e.g. a mineral acid such as hydrogen chloride sulfuric acid, nitric acid, phosphoric acid or an organic acid such as maleic acid, fumaric acid, succinic acid or acetic acid.

According to the above process, the following benzodiazepine derivatives, for example, are obtained:

1-dimethylaminoacetyl-5-phenyl-2,3-dihydro-1H-1,4-benzodiazepine,
1-dimethylaminoacetyl-5-phenyl-7-chloro-2,3-dihydro-1H-1,4-benzodiazepine,
1-dimethylaminoacetyl-5-phenyl-7-trifluoromethyl-2,3-dihydro-1H-1,4-benzodiazepine,
1-diethylaminoacetyl-5-phenyl-2,3-dihydro-1H-1,4-benzodiazepine,
1-diethylaminoacetyl-5-phenyl-7-chloro-2,3-dihydro-1H-1,4-benzodiazepine,
1-diethylaminoacetyl-5-phenyl-7-trifluoroacetyl-2,3-dihydro-1H-1,4-benzodiazepine,
1-dimethylaminoacetyl-5-(o-chlorophenyl)-7-chloro-2,3-dihydro-1H-1,4-benzodiazepine,
1-dimethylaminoacetyl-5-(o-fluorophenyl)-7-chloro-2,3-dihydro-1H-1,4-benzodiazepine,
1-dimethylaminoacetyl-5-phenyl-7-methoxy-2,3-dihydro-1H-1,4-benzodiazepine,
1-dimethylaminoacetyl-5-phenyl-7-methyl-2,3-dihydro-1H-1,4-benzodiazepine,
1-dimethylaminoacetyl-5-phenyl-7-bromo-2,3-dihydro-1H-1,4-benzodiazepine,
1-diethylaminoacetyl-5-(o-fluorophenyl)-7-chloro-2,3-dihydro-1H-1,4-benzodiazepine,
1-dimethylaminopropionyl-5-phenyl-2,3-dihydro-1H-1,4-benzodiazepine,
1-dimethylaminopropionyl-5-phenyl-7-chloro-2,3-dihydro-1H-1,4-benzodiazepine,
1-diethylaminopropionyl-5-phenyl-7-chloro-2,3-dihydro-1H-1,4-benzodiazepine,
1-dimethylaminobutyroyl-5-phenyl-7-chloro-2,3-dihydro-1H-1,4-benzodiazepine, 1-diethylaminobutyroyl-5-phenyl-7-chloro-2,3-dihydro-1H-1,4-benzodiazepine,
1-oxamoyl-5-phenyl-2,3-dihydro-1H-1,4-benzodiazepine,
1-oxamoyl-5-phenyl-7-chloro-2,3-dihydro-1H-1,4-benzodiazepine,
1-oxamoyl-5-phenyl-7-nitro-2,3-dihydro-1H-1,4-benzodiazepine,
1-oxamoyl-5-phenyl-7-methoxy-2,3-dihydro-1H-1,4-benzodiazepine,
1-oxamoyl-5-phenyl-7-methyl-2,3-dihydro-1H-1,4-benzodiazepine,
1-oxamoyl-5-phenyl-7-trifluoromethyl-2,3-dihydro-1H-1,4-benzodiazepine,
1-oxamoyl-5-(p-chlorophenyl)-7-chloro-2,3-dihydro-1H-1,4-benzodiazepine,
1-(N-methyloxamoyl)-5-phenyl-2,3-dihydro-1H-1,4-benzodiazepine,
1-(N-methyloxamoyl)-5-phenyl-7-chloro-2,3-dihydro-1H-1,4-benzodiazepine,
1-(N-methyloxamoyl)-5-phenyl-7-nitro-2,3-dihydro-1H-1,4-benzodiazepine,
1-(N-methyloxamoyl)-5-phenyl-7-methoxy-2,3-dihydro-1H-1,4-benzodiazepine,
1-(N-ethyloxamoyl)-5-phenyl-7-chloro-2,3-dihydro-1H-1,4-benzodiazepine,
1-(N-ethyloxamyl)-5-phenyl-7-nitro-2,3-dihydro-1H-1,4-benzodiazepine,
1-(N,N-dimethyloxamoyl)-5-phenyl-2,3-dihydro-1H-1,4-benzodiazepine,
1-(N,N-dimethyloxamoyl)-5-phenyl-7-chloro-2,3-dihydro-1H-1,4-benzodiazepine,
1-(N,N-dimethyloxamoyl)-5-phenyl-7-methoxy-2,3-dihydro-1H-1,4-benzodiazepine,
1-(N,N-dimethyloxamoyl)-5-phenyl-7-nitro-2,3-dihydro-1H-1,4-benzodiazepine,
1-(N,N-dimethyloxamoyl)-5-phenyl-7-trifluoromethyl-2,3-dihydro-1H-1,4-benzodiazepine,
1-(N,N-dimethyloxamoyl)-5-(p-chlorophenyl)-7-chloro-2,3-dihydro-1H-1,4-benzodiazepine,
1-(N,N-diethyloxamoyl)-5-phenyl-7-trifluoromethyl-2,3-dihydro-1H-1,4-benzodiazepine,
1-(N,N-diethyloxamoyl)-5-phenyl-7-nitro-2,3-dihydro-1H-1,4-benzodiazepine,
1-(N,N-diethyloxamoyl)-5-phenyl-7-chloro-2,3-dihydro-1H-1,4-benzodiazepine,
1-(N,N-diethyloxamoyl)-5-phenyl-7-bromo-2,3-dihydro-1H-1,4-benzodiazepine,
1-(N,N-dimethyloxamoyl)-5-(o-fluorophenyl)-7-nitro-2,3-dihydro-1H-1,4-benzodiazepine,
1-(N-methyl-N-ethyloxamoyl)-5-phenyl-7-chloro-2,3-dihydro-1H-1,4-benzodiazepine, and
1-(N,N-dipropyloxamoyl)-5-phenyl-7-chloro-2,3-dihydro-1H-1,4-benzodiazepine.

Among these compounds, 1-oxamoyl-benzodiazepine derivatives of the formula:

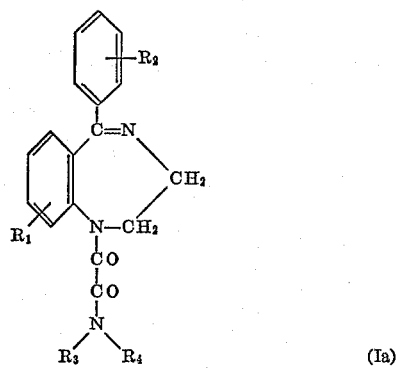

(Ia)

wherein $R_1$, $R_2$, $R_3$ and $R_4$ are as defined above, are novel and have prominent effects as tranquilizers, muscle-relaxants, antispasmodics and hypnotics, and therefore novel pharmaceutical composition can be provided by mixing an effective amount of the novel benzodiazepine derivative of the Formula Ia with pharmaceutically acceptable carrier.

This invention is further disclosed in the following examples of preferred embodiments thereof, which are presented for purpose of illustration and are not intended to limit the scope of the invention.

EXAMPLE 1

To a suspension of 2.45 g. of sodium hydride in 50 ml. of dimethylformamide is added dropwise a solution of 30.4 g. of 2-(N,N-dimethylcarbamoyl)-3-phenyl-5-chloroindole in 200 ml. of dimethylformamide at room temperature. The mixture is stirred at 20° C. for 30 minutes and then cooled. To the mixture is added 7.7 g. of chloroacetonitrile and the resulting mixture is stirred at 20° C. for 1.5 hours. The reaction mixture is diluted with water and extracted with ether. The ethereal layers are combined, washed with water and dried over sodium sulfate, and the solvent is removed. The residue is recrystallized from ethanol to give 1-cyanomethyl-2-(N,N-dimethylcarbamoyl)-3-phenyl-5-chloroindole as colorless needles, M.P. 110°–111° C.

EXAMPLE 2

To a solution of 32 g. of 2-(N,N-diethylcarbamoyl)-3-(o-fluorophenyl)-5-chloroindole in 200 ml. of dimethylformamide is added portionwise 4.18 g. of sodium hydride and the mixture is stirred at 25°–29° C. for 100 minutes. To the mixture is added portionwise 8.4 g. of chloroacetonitrile. The resulting mixture is stirred at 25° C. for 1 hour and then heated to 80°–110° C. for 5.5 hours with stirring.. The reaction mixture is poured into 1500 ml. of water and extracted with ether. The ethereal layer is combined, washed with water and dried over sodium sulfate and the solvent is removed. The oily residue is crystallized from isopropyl alcohol to give 22.5 g. of 1-cyanomethyl-2 - (N,N-diethylcarbamoyl)-3-(o-fluorophenyl)-5-chloroindole, M.P. 105°–108° C. Recrystallization from isopropyl alcohol gives colorless prisms, M.P. 107°–109° C.

EXAMPLE 3

According to the procedure of Example 1, but replacing 2 - (N,N-dimethylcarbamoyl)-3-phenyl-5-chloroindole by 2 - (N,N - dimethylcarbamoyl)-3-phenyl-5-nitroindole, there is obtained 1 - cyanomethyl - 2 - (N,N-dimethylcarbamoyl) - 3 - phenyl-5-nitroindole which is recrystallized from ethanol, M.P. 172°–172.5° C.

EXAMPLE 4

A solution of 19.3 g. of 1-cyanomethyl-2-(N,N-dimethylcarbamoyl)-3-phenyl-5-chloroindole in 100 ml. of anhydrous tetrahydrofuran is added dropwise to a suspension of 6 g. of lithium aluminum hydride in anhydrous ether at room temperature. The mixture is refluxed with stirring for 3 hours. After the reaction mixture is cooled with ice, water is added dropwise carefully to the mixture with stirring under cooling to decompose the excess hydride and cleave the complex. The organic layer is separated and dried over sodium sulfate, and the solvent is removed to 16.7 g. of 1-(2'-aminoethyl)-2-(N,N-dimethylaminomethyl) - 3 - phenyl-5-chloroindole as an oil. Thus obtained free base is dissolved in ether and gaseous hydrogen chloride is bubbled into the solution under cooling with stirring. The precipitate is collected by filtration to give the dihydrochloride which is recrystallized from ethanol to give colorless crystals, M.P. 242°–248° C. (decomp.).

EXAMPLE 5

To a suspension of 8.8 g. of lithium aluminum hydride in 180 ml. of anhydrous ether is added portionwise 15 g. of 1-cyanomethyl-2-(N,N-diethylcarbamoyl)-3-(o-fluorophenyl)-5-chloroindole below 20° C. The mixture is heated under reflux for 4 hours. After the reaction mixture is cooled with ice, 70 ml. of water is added dropwise carefully thereto to decompose the excessive hydride and cleave the complex. The ethereal layer is separated by decantation and the residue is washed with ether. The organic layers are combined and the solvent is removed to give 14.4 g. of 1-(2'-aminoethyl)-2-(N,N-diethylaminomethyl)-3-(o-fluorophenyl) - 5 - chloroindole. Thus obtained free base (14.4 g.) is dissolved in 30 ml. of ethanol and treated with ethanolic hydrogen chloride, and the solvent is removed. The residue is recrystallized by dissolving in hot isopropyl alcohol, adding ether and cooling to give hydrochloride.

An analytical sample is obtained by converting the thus obtained hydrochloride to free base and purifying it by chromatography on silica gel, and then converting the obtained pure base to the hydrochloride, M.P. 223°–225° C.

EXAMPLE 6

A solution of 10 g. of 1-cyanomethyl-2-(N,N-dimethylcarbamoyl)-3-phenyl-5-chloroindole in a mixture of 50 ml. of tetrahydrofuran and 50 ml. of ethanol is hydrogenated at 20° C. and atmospheric pressure over Raney nickel which is obtained by treating 15 g. of 50% Raney nickel alloy with aqueous sodium hydroxide solution at 90° C. for 1 hour, until 2 molar equivalents of hydrogen has been absorbed. The catalyst is removed by filtration and the filtrate is evaporated to dryness under vacuum. The resulting residue is dissolved in ether and gaseous hydrogen chloride is bubbled into the solution. The precipitate is collected by filtration, washed with ether and recrystallized from benzene-ethanol to give 6.5 g. of 1-(2' - aminoethyl)-2-(N,N-dimethylcarbamoyl)-3-phenyl-5-chloroindole hydrochloride having a melting point of 226°–230° C. (decomp.). Recrystallization from ethanol gives colorless needles having a melting point of 228°–230° C. (decomp.). The free base is obtained by treating the hydrochloride with ammonia. Recrystallization from cyclohexane-benzene gives crystals having a melting point of 47°–49° C.

EXAMPLE 7

To a solution of 3.5 g. of 1-cyanomethyl-2-(N,N-dimethylcarbamoyl)-3-phenyl-5-nitroindole in 20 ml. of dry tetrahydrofuran is added 0.5 g. of sodium borohydride. To the mixture is added dropwise a solution of 1.5 g. of boron trifluoride-etherate in 10 ml. of dry tetrahydrofuran at 20° C. with stirring. After addition, stirring is continued at 20° C. for additional 3 hours. To the reaction mixture is added dropwise water and the mixture is extracted with chloroform. The chloroform layers are combined, washed with water and dried over sodium sulfate, and the solvent is removed under vacuum to give 1-(2'-aminoethyl) - 2 - (N,N-dimethylcarbamoyl)-3-phenyl-5-nitroindole as a yellow solid. The thus-obtained solid is dissolved in ethanol containing hydrogen chloride and the solvent is removed under vacuum. The resulting residue is recrystallized from isopropyl alcohol to give 3.1 g. of 1 - (2' - aminoethyl)-2-(N,N-dimethylcarbamoyl)-3-phenyl-5-nitroindole hydrochloride as yellow crystals having a melting point of 175°–178° C.

EXAMPLE 8

A solution of 5 g. of 1-cyanomethyl-2-(N,N-dimethylcarbamoyl)-3-phenyl-5-nitroindole in 150 ml. of tetrahydrofuran is hydrogenated at room temperature and atmospheric pressure over Raney nickel until 5 molar equivalent of hydrogen has been absorbed. The catalyst is removed by filtration and the filtrate is evaporated to dryness under vacuum. The resulting residue is dissolved in ethanolic hydrogen chloride and the solvent is removed under vacuum. The residue is crystallized from ethanol-ether to give 1 - (2' - aminoethyl)-2-(N,N-dimethylcarbamoyl)-3-phenyl-5-aminoindole dihydrochloride as pale yellow prisms, M.P. 213°–216° C.

EXAMPLE 9

Ozonized oxygen is bubbled into a mixture of 4.5 g. of 1 - (2' - aminoethyl)-2-(N,N-dimethylaminomethyl)-3-phenyl-5-chloroindole dihydrochloride and 100 ml. of acetic acid at 15°–20° C. for 1 hour. To the reaction mixture is added ice-water, and the mixture is neutralized with aqueous sodium carbonate solution and extracted with chloroform. The chloroform extracts are combined, washed with water and dried over sodium sulfate, and the solvent is removed to give 2.5 g. of 1-(dimethylaminoacetyl) - 5 - phenyl-7-chloro-2,3-dihydro-1H-1,4-benzodiazepine as a solid. The thus-obtained crude solid is chromatographed on silica gel eluting benzene followed by ethanol to give a pure compound, which is recrystallized from isopropyl alcohol, M.P. 185°–186° C.

EXAMPLE 10

A solution of 2 g. of chromic anhydride in 2 ml. of water is added dropwise to a suspension of 2 g. of 1-(2'-aminoethyl) - 2 - (N,N-dimethylaminomethyl)-3-phenyl-5-chloroindole dihydrochloride in 20 ml. of glacial acetic acid at 15°–20° C. with stirring. The mixture is stirred at 25° C. for 5 hours. The mixture is diluted with ice-water, neutralized with aqueous sodium carbonate solution, and extracted with chloroform. The chloroform extracts are treated in the similar manner to that in Example 9 to give 1-(dimethylaminoacetyl)-5-phenyl-7-chloro-2,3-dihydro-1H-1,4-benzodiazepine.

EXAMPLE 11

Ozonized oxygen is bubbled into a solution of 5 g. of 1 - (2' - aminoethyl)-2-(N,N-diethylaminomethyl)-3-(o-fluorophenyl)-5-chloroindole hydrochloride in 50 ml. of acetic acid at 15°–22° C. for 1.5 hours. The reaction mixture is diluted with 50 ml. of water and 100 ml. of ether and neutralized with ammonia water. The ethereal layer is separated and the aqueous layer is extracted with ether. The ethereal layers are combined and dried over sodium sulfate, and the solvent is removed to give 2.6 g. of 1-(diethylaminoacetyl)-5-(o-fluorophenyl)-7-chloro-2,3-dihydro-1H-1,4-benzodiazepine as an oil. The thus-obtained oil is dissolved in ethanol and treated with ethanolic hydrogen chloride and the solvent is removed under reduced pressure. The resulting residue is crystallized from isopropyl alcohol-ether to give the dihydrochloride having a melting point of 196°–201° C. (decomp.).

EXAMPLE 12

A solution of 3 g. of chromic anhydride in 30 ml. of acetic acid in 3 ml. of water is added dropwise at 10° C. to a solution of 3 g. of 1-(2'-aminoethyl)-2-(N,N-dimethylcarbamoyl) - 3 - phenyl-5-chloroindole hydrochloride in 30 ml. of acetic acid. The mixture is stirred at 15° C. for 15 hours. The reaction mixture is poured into ice-water, neutralized with ammonia water and extracted with chloroform. The chloroform extracts are combined, washed with water and dried over sodium sulfate, and the solvent is removed under reduced pressure. The residue is dissolved in 30 ml. of ethanol and 100 ml. of ether and filtered. The filtrate is concentrated to dryness under reduced pressure. The residue is crystallized from petroleum benzine to give 1-(N,N-dimethyloxamoyl) - 5-phenyl-7-chloro-2,3-dihydro-1H-1,4 - benzodiazepine. Recrystallization from petroleum benzin-benzene gives colorless prisms having a melting point of 171°–173° C.

What is claimed is:
1. 1-oxamoyl-benzodiazepine derivatives of the formula:

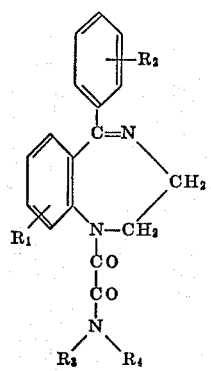

(I-a)

wherein $R_1$ and $R_2$ signify individually hydrogen atom, halogen atom, lower alkyl group having up to 4 carbon atoms, lower alkoxy group having up to 4 carbon atoms, trihalomethyl group or nitro group; and $R_3$ and $R_4$ signify individually a hydrogen atom, or a lower alkyl group having up to 4 carbon atoms.

2. 1 - (N,N - dimethyloxamoyl)-5-phenyl-7-chloro-2,3-dihydro-1H-1,4-benzodiazepine.

References Cited
UNITED STATES PATENTS
3,236,838    2/1966   Archer et al. _____ 260—239 BD ALTON D. ROLLINS, Primary Examiner